March 15, 1949.　　　　C. A. PRATT　　　　2,464,344
SHAKER CONVEYER
Filed Nov. 23, 1945　　　　　　　　　　3 Sheets-Sheet 1
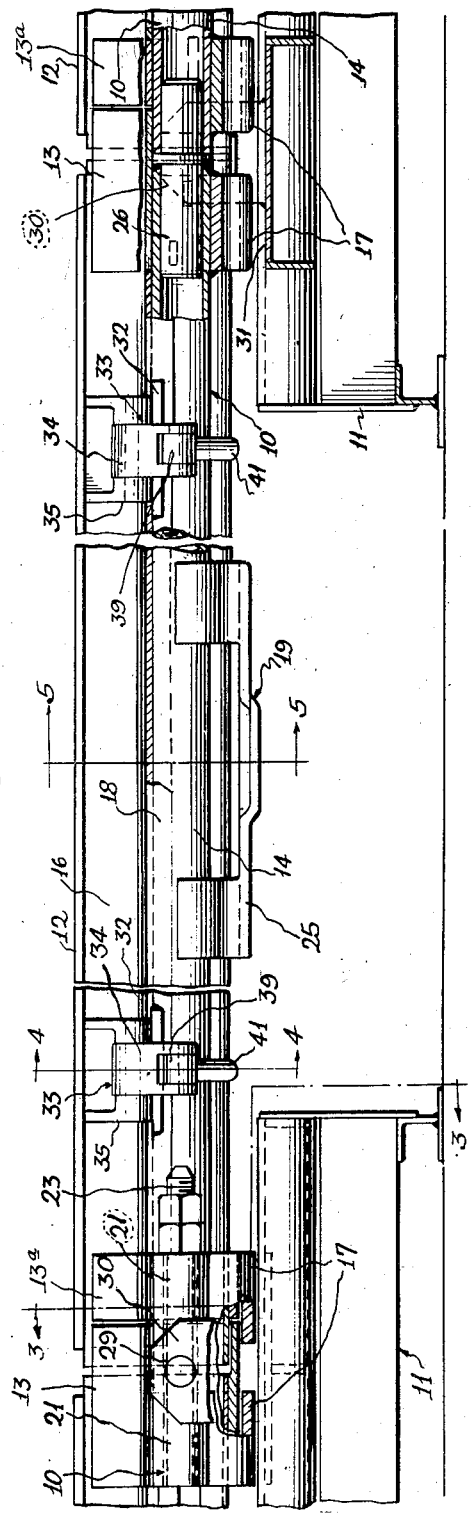
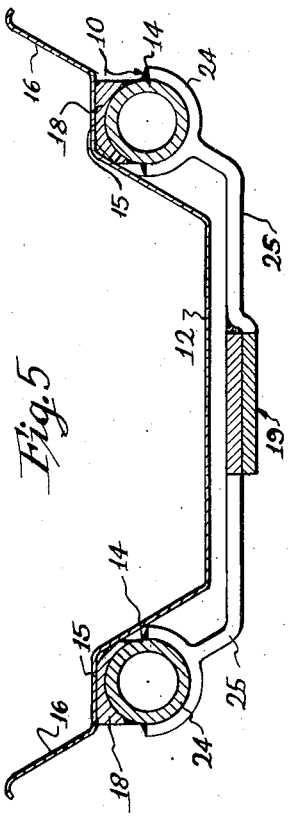
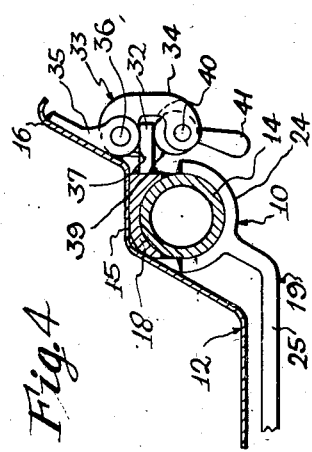
INVENTOR
Charles A. Pratt
BY Clarence F. Poole
ATTORNEY March 15, 1949.  C. A. PRATT  2,464,344
SHAKER CONVEYER
Filed Nov. 23, 1945  3 Sheets-Sheet 2
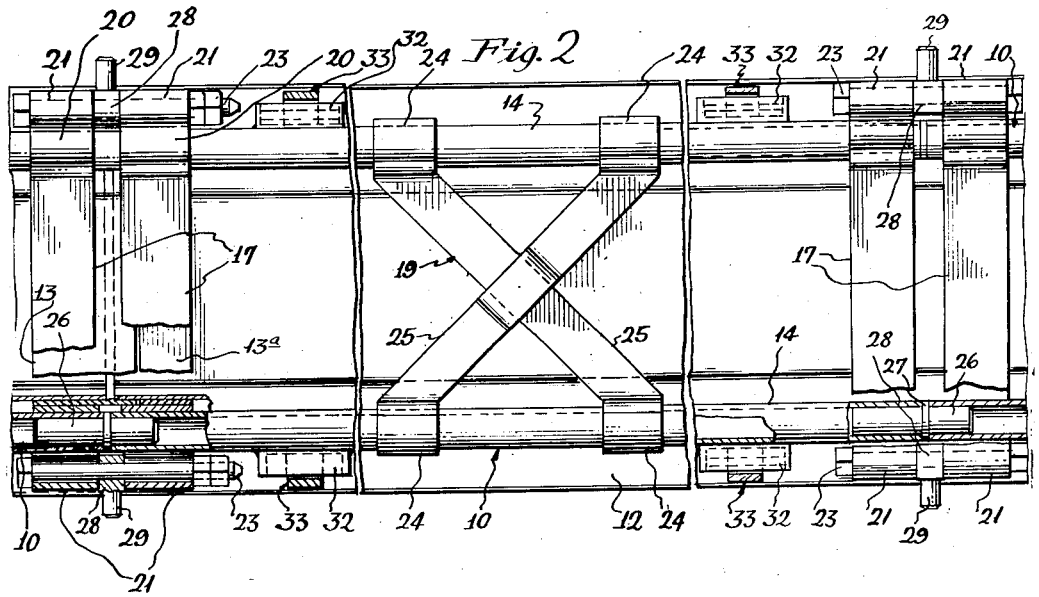
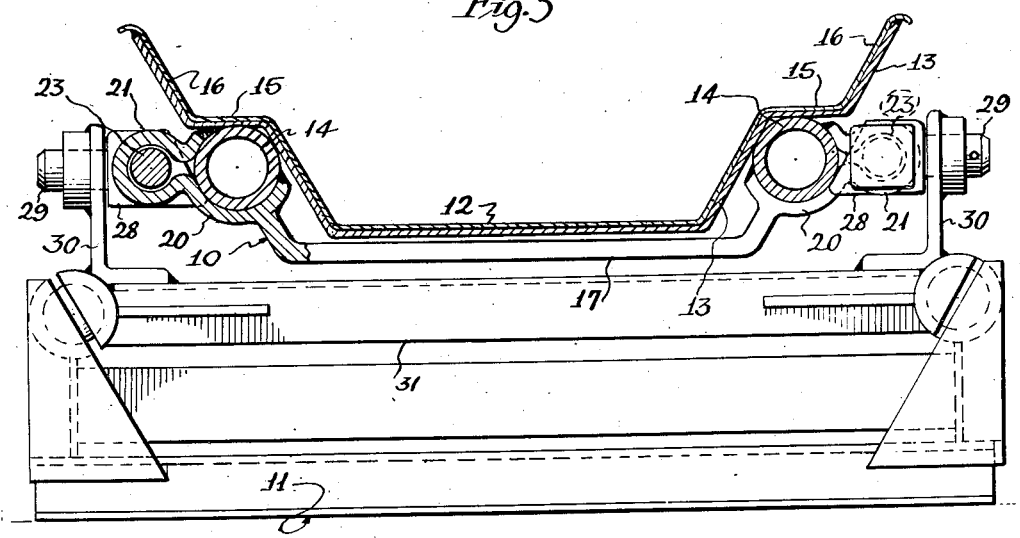
INVENTOR
Charles A Pratt
BY
Clarence F. Poole
ATTORNEY March 15, 1949.   C. A. PRATT   2,464,344
SHAKER CONVEYER
Filed Nov. 23, 1945   3 Sheets-Sheet 3
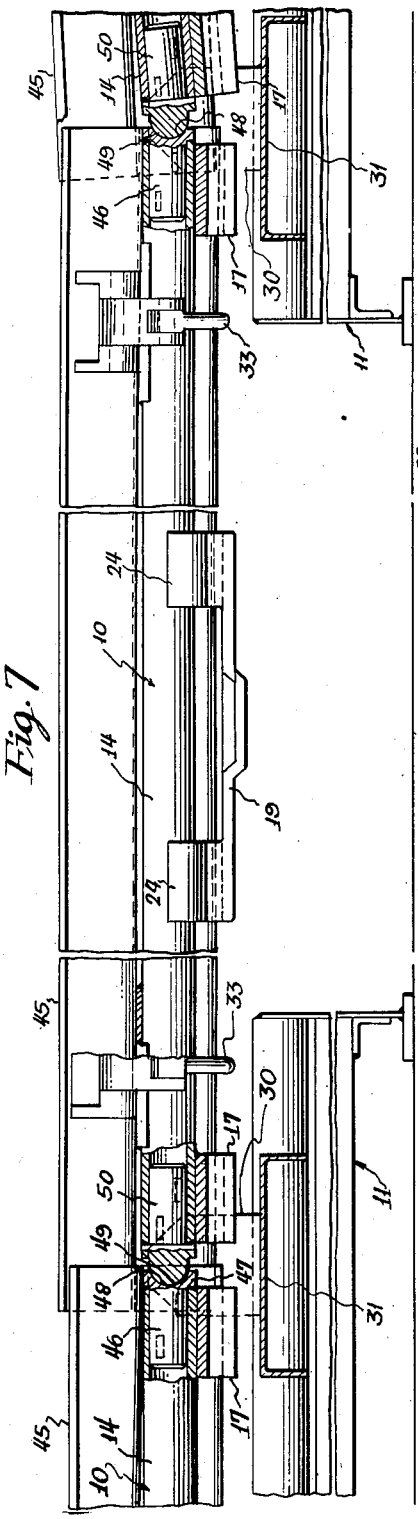
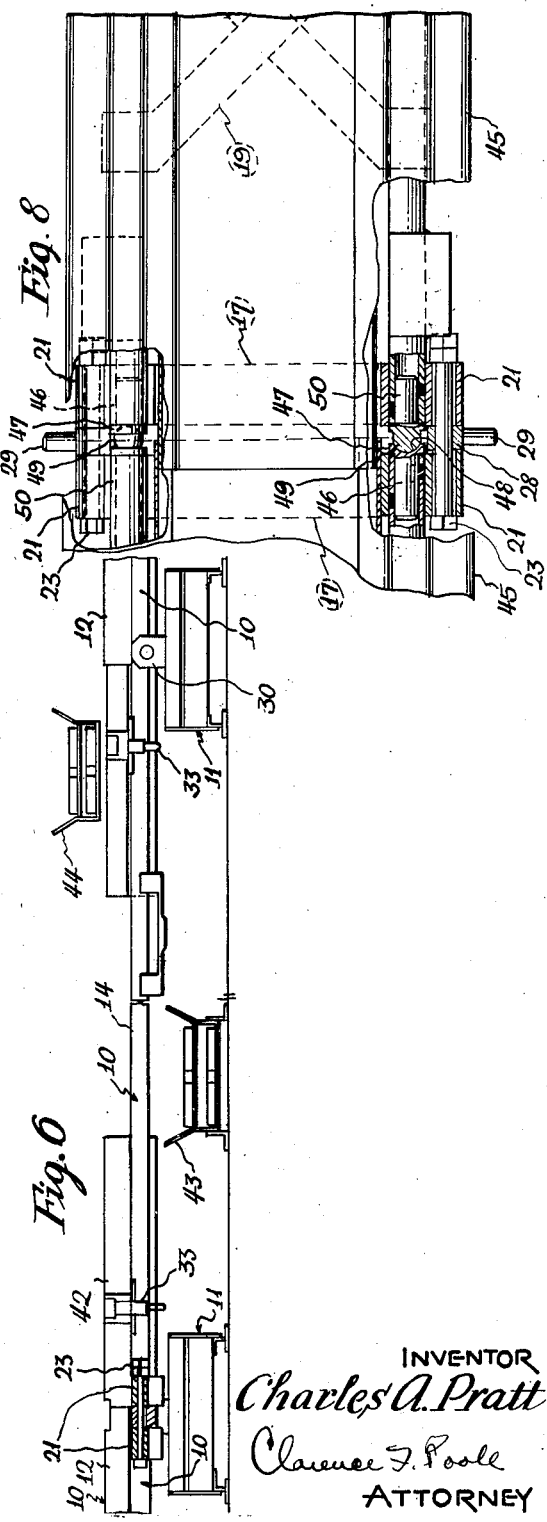
INVENTOR
Charles A. Pratt
Clarence F. Poole
ATTORNEY Patented Mar. 15, 1949

2,464,344

UNITED STATES PATENT OFFICE 2,464,344

SHAKER CONVEYER

Charles A. Pratt, Chicago, Ill., assignor to Goodman Manufacturing Company, Chicago, Ill., a corporation of Illinois Application November 23, 1945, Serial No. 630,309

7 Claims. (Cl. 198—220)

This invention relates to improvements in shaker conveyers, and more particularly relates to a new and improved form of shaker conveyer trough line.

Among the objects of my invention are to provide a new and improved form of shaker conveyer trough line including a plurality of trough supporting cradles connected together in end to end relation, to take the stresses of the conveyer from one end of the trough line to the other during reciprocation thereof and forming a means for detachably carrying the material carrying troughs of the conveyer.

Another object of my invention is to provide a novel form of cradle forming a support for a trough of the conveyer trough line and so arranged as to take the stresses of the conveyer during operation thereof and to permit the use of light weight troughs which may readily be renewed when worn.

Still another object of my invention is to provide a novel form of cradle adapted to have a trough of the conveyer detachably mounted thereon, which is so arranged as to conform to an uneven mine bottom and to take the stresses of the conveyer from one end thereof to the other.

A more specific object of my invention is to provide a crade forming a support for a trough of a shaker conveyer trough line, together with a means for readily connecting said trough to said cradle, or permitting said trough to be removed therefrom for renewal or for providing a discharge point intermediate the ends of the trough line.

These and other objects of my invention will appear from time to time as the following specification proceeds and with reference to the accompanying drawings wherein:

Figure 1 is a fragmentary view in side elevation of a part of a shaker conveyer trough line and illustrating one form in which my invention may be embodied;

Figure 2 is a fragmentary bottom plan view of the shaker conveyer trough line shown in Figure 1, drawn to a slightly reduced scale and showing the troughs and cradles removed from their supporting ball frames and also showing certain parts broken away and in substantially horizontal section;

Figure 3 is a fragmentary transverse section taken substantially along line 3—3 of Figure 1;

Figure 4 is a fragmentary transverse sectional view taken substantially along line 4—4 of Figure 1;

Figure 5 is a fragmentary transverse sectional view taken substantially along line 5—5 of Figure 1;

Figure 6 is a diagrammatic view in side elevation of a conveyer trough line showing the trough line arranged for discharging intermediate its ends;

Figure 7 is an enlarged fragmentary view in side elevation of a shaker conveyer trough line with the troughs shown in overlapping instead of abutting relation and illustrating a modified form of my invention; and Figure 8 is a fragmentary bottom plan view of a shaker conveyer trough line of the modified form of my invention shown in Figure 7, drawn to a slightly reduced scale and showing the troughs and cradles removed from their supporting ball frames.

In the embodiment of my invention illustrated in Figures 1 to 5 of the drawings, a plurality of trough supporting cradles 10, 10 are herein shown as being connected together in abutting relation with respect to each other and as being reciprocably mounted on ball frames 11, 11 of a well known form. Said cradles are each adapted to form a support for and to have a trough 12 of a shaker conveyer trough line detachably mounted thereon. Said cradles may be reciprocably driven from a suitable conveyer drive mechanism (not shown) to reciprocate the troughs 12, 12 and cause material to move along said troughs from the receiving to the discharge end of the trough line. Said drive mechanism and its drive connection to the trough line is not herein shown or described since it forms no part of my present invention.

Each cradle 10 includes a pair of laterally spaced longitudinally extending columns 14, 14. Said columns form the trough supporting members of said cradles and are adapted to have intermediate shouldered portions 15, 15 of oppositely inclined side walls 16, 16 of a trough of the conveyer trough line supported thereon, as will more clearly appear as this specification proceeds. Said troughs are herein shown as being connected in abutting relation with respect to each other, but may overlap at their adjacent ends if desired. A strap 13 extends along the bottom of and upwardly along opposite sides of one end of each of said troughs and is overlapped by an adjacent end of the next adjacent trough, to prevent material from spilling through the abutting joints between said troughs. A similar reinforcing strap 13a is spaced inwardly from an adjacent end of the next adjacent trough 12 and serves as a reinforcing means therefor. A spacing is provided between adjacent ends of said straps to allow for irregularities in the trough line. It is obvious that said spacing may be varied to meet different floor conditions.

The columns 14, 14 are herein shown as being of a tubular formation with a bearing bar 18 extending along the upper side thereof, and having the shouldered portion 15 of the trough 12 resting thereon, but may be of any other well known form which will lend rigidity and still permit the use of a member of relatively light weight. Said columns are connected together adjacent their opposite ends by transversely extending straps 17, 17, and are connected intermediate their ends by an X-brace 19.

The transversely extending straps 17, 17 each have opposite upturned semi-cylindrical end portions 20, 20 formed integrally with the ends thereof and extending partially around the undersides of opposite columns 14 and secured thereto in a suitable manner, such as welding (see Figure 3). As herein shown, connecting eyes 21, 21 form lateral continuations of said semi-cylindrical end portions of said straps, and extend outwardly therefrom and inwardly to the columns 14, 14, and are secured at their inner ends to said columns, as by welding. Said connecting eyes are adapted to receive connecting bolts 23, 23 for connecting the cradles 10, 10 together at their ends, in much the same manner as is usually employed in connecting adjacent ends of the troughs of a shaker conveyer together.

Each strap 17 extends from the semi-cylindrical end portions 20, 20 thereof in an angularly downwardly and inwardly direction and conforms substantially to the form of the cross section of the lower portion of the trough 12 and is shown as being spaced downwardly therefrom so the troughs may be wholly supported on the columns 14, 14.

The X-brace 19, like the straps 17, 17, is of a form substantially conforming to the cross section of the lower portion of said trough. Said brace has upwardly facing semi-cylindrical end portions 24, 24, at the upper ends of cross straps 25, 25 of said brace, which extend outwardly therefrom and are secured to the tubular columns 14, 14, as by welding.

Each column has a shaft 26 mounted in and secured to one of its ends, as by welding, and projecting therefrom. The projecting end of said shaft is adapted to extend within the tubular portion of the next adjacent column 14 to form a means for aligning said columns and cradles. If desired, the fit between said projecting end of said shaft and said next adjacent column may be relatively loose to permit the trough line to conform to irregularities in the mine bottom. Said shaft is herein shown as having an integrally formed shouldered portion 27 intermediate its ends and adapted to be abutted by adjacent ends of said columns, to form plane abutting surfaces therebetween so adjacent columns may be drawn into engagement with said surfaces by the connecting bolts 23, 23. Said shafts are alternately arranged for each end of each cradle so either end of one cradle may be connected to an adjacent end of a next adjacent cradle.

An ear 28 is mounted on each connecting bolt 23 between adjacent ends of the connecting eyes 21, 21. Said ear has a lug or shaft 29 projecting laterally therefrom which is adapted to be pivotally mounted in an upright support bracket 30, extending upwardly from an upper frame member 31 of the ball frame 11, for pivotally supporting adjacent ends of the cradles 10, 10 on said ball frame. Said ears are of an irregular formation and are adapted to engage the columns 14, 14 to prevent turning movement thereof about the axes of the connecting bolts 23, 23.

The troughs 12, 12 may be clamped directly to the columns 14, 14, by a suitable clamping means extending around said columns, but as herein shown, a plate 32 extends laterally from each column 14, adjacent each end thereof. Said plates are herein shown as being welded to the bearing bars 18, 18, but may be an extension of said bars if desired and also may extend the entire length of said bars, to permit the troughs to be secured to said columns at any desired point therealong. Each of said plates is adapted to be engaged by a clamping member 33, secured to the outer upper side wall 16 of the trough 12, for detachably holding said troughs to said cradles. Each clamping member 33 includes a substantially C-shaped frame 34, longitudinally pivoted adjacent its upper end between the furcations of a bifurcated bracket 35, on a pivotal pin 36. Said bracket is secured to the upper inclined portion of the side wall 16 of the trough 12. Said bracket has a flat lower face 37 adapted to be engaged with the upper face of the plate 32 by an eccentrically mounted disk 39 (see Figure 4). Said disk is mounted on the end of said frame opposite from the pivotal pin 36, eccentrically of its center, on a pivotal pin 40. An arm or lever 41 is herein shown as being formed integrally with an extending outwardly from said disk, to pivotally move said disk into engagement with the under portion of said plate 32 and firmly clamp the trough 12 to the cradle 10.

In Figure 6 of the drawings a short trough 42 is diagrammatically shown as being mounted in an intermediate cradle 10 of the shaker trough line to cause material to be discharged intermediate the ends of said cradle and at an intermediate portion of the shaker conveyer trough line. As herein shown the trough 42 is arranged to discharge into a transversely extending conveyer 43. An elevating conveyer 44 is also shown as being provided to load material onto the trough line at a point beyond its intermediate discharge point.

Trough sections of any desired length may be mounted on the cradles 10, 10 to permit the discharge of material at various intermediate points along the trough line. This makes the trough line more flexible than formerly and is especially useful where one portion of the trough line is used to convey rock and the rest of the trough line is used to convey coal and it is desired to unload the rock intermediate the ends of the trough line and gob it in a cross entry or abandoned working place.

In the modified form of my invention shown in Figures 7 and 8, troughs 45, 45 of a shaker conveyer trough line are shown as being connected in overlapping relation with respect to each other instead of abutting relation, although it should be understood that abutting troughs could as well be used. A pivotal connection is also provided between adjacent ends of the cradles 10, 10 to permit the trough line to more readily follow an uneven mine bottom than when the shafts 26, 26 are used to hold adjacent ends of said cradles in alignment with each other. In the construction shown in these figures the cradles 10, 10 are of the same general construction as in Figures 1 to 5 inclusive, except that the columns 14, 14 are not provided with the bearing bars 18, 18 extending therealong. The means for detachably clamping said troughs to said cradles are also of the same construction, so said clamping means will not be again described and the part numbers applied to said cradles and clamping means in Figures 1 to 5 inclusive will be applied in Figures 7 and 8 to the parts that are the same as in Figures 1 to 5.

In the modified form of my invention shown in Figures 7 and 8, material will flow from the overlapping to the underlapped troughs, which in these figures is from right to left. A shaft 46 is mounted in one end of one column 14 and is suitably secured thereto as by welding through apertured portions of said columns. Said shaft has a shouldered portion 47 abutting the end of the column 14 and is provided with a concave socket 48 adapted to be engaged by a ball-shaped projecting end 49, projecting from a shouldered shaft 50 mounted in an adjacent end of the next adjacent column 14 and secured thereto, as by welding. The shafts 46 and 50 are herein shown as being alternately arranged for each end of each cradle so either end of one cradle may readily be connected to an adjacent end of a next adjacent cradle. Sufficient clearance is provided between the eyes 21, 21 and the connecting bolts 23, 23, to permit a limited amount of pivotal movement of one trough with respect to the other about the pivotal connections therebetween, formed by adjacent ends of the shafts 46 and 50. The longitudinal axes of said connecting bolts are herein shown as being in alignment with the longitudinal axes of the columns 14, 14, as is shown in the form of my invention illustrated in Figure 3, so that said bolts may connect adjacent ends of said cradles together and permit movement of one with respect to another, to permit the trough line to conform to an uneven mine bottom, but still allow the stresses of the conveyer to be taken through the columns 14, 14, shafts 46 and 50, and said connecting bolts.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a shaker conveyer trough line, a plurality of cradles, each including two connected laterally spaced longitudinally extending trough supporting members, means for connecting said trough supporting members together in end to end relationship so said members will form connected spaced apart columns extending the entire length of the conveyer and take the stresses of the conveyer during reciprocation thereof, a trough section adapted to be mounted on each pair of said laterally spaced trough supporting members and form a material conveying means for the conveyer, and a plurality of clamping members extending along opposite sides of said trough sections and cradles for detachably connecting said trough sections with said trough supporting members.

2. In a shaker conveyer trough line, a plurality of cradles, each including two connected laterally spaced longitudinally extending trough supporting members, means for connecting said trough supporting members together in end to end relationship so said members will form spaced apart columns extending the entire length of the conveyer and take the stresses of the conveyer during reciprocation thereof, a trough section adapted to be mounted on each pair of said laterally spaced trough supporting members and form a material conveying means for the conveyer, and means for detachably mounting said trough sections on said trough supporting members including clamping members adapted to have clamping engagement with projecting portions of said trough supporting members.

3. A cradle adapted to detachably support a trough of a shaker conveyer trough line including two parallel columns, means for connecting said columns in laterally spaced relation with respect to each other, projecting means on one end of each of said columns, and recessed means on the opposite ends of said columns, said projecting and recessed means being adapted to have interengaging bearing connection with similar projecting and recessed means of next adjacent columns, to form a pivotal connection therebetween and permit said cradles to be connected in substantially aligned relation with respect to each other and conform to an uneven floor, and connecting means in alignment with the longitudinal axes of said columns, for connecting said columns together and causing said columns to take the stresses of the conveyer during reciprocation thereof.

4. In a shaker conveyer trough line, a plurality of cradles, each including a pair of longitudinally extending trough supporting members and means for connecting said trough supporting members together in laterally spaced relation with respect to each other, means for connecting said cradles together in end to end relationship so said trough supporting members will form spaced apart columns extending the entire length of the conveyer and take the stresses of the conveyer during reciprocation thereof, a trough section adapted to be mounted on said trough supporting members and form a material conveying means for the conveyer, and means for detachably mounting said trough sections on said cradles including a plurality of clamping members longitudinally pivoted to the outer side walls of said troughs and adapted to have clamping engagement with projecting portions of said cradles.

5. In a shaker conveyer trough line, a plurality of cradles, each including a pair of longitudinally extending trough supporting members and means for connecting said trough supporting members together in laterally spaced relation with respect to each other, means for connecting said cradles together in end to end relationship so said trough supporting members will form spaced apart columns extending the entire length of the conveyer and take the stresses of the conveyer during reciprocation thereof, a trough section adapted to be mounted on said cradles and form a material conveying means for the conveyer, and means for detachably mounting said trough sections on said cradles including a plurality of plate members projecting laterally outwardly from said trough supporting means, and clamping members longitudinally pivoted to the outsides of said trough sections and adapted to have clamping engagement with opposite sides of said plate members.

6. In a shaker conveyer trough line, a plurality of cradles, each including a pair of longitudinally extending trough supporting members and means for connecting said trough supporting members together in laterally spaced relation with respect to each other, means for connecting said cradles together in end to end relationship so adjacent ends of said trough supporting members will abut and form spaced apart columns extending the entire length of the conveyer to take the stresses of the conveyer during reciprocation thereof, a trough section adapted to be mounted on said cradles and form a material conveying means for the conveyer, and means for detachably mounting said trough sections on said cradles including a plurality of plate members projecting laterally outwardly from said trough supporting members, and clamping members attached to the outside of said trough sections and adapted to have clamping engagement with opposite sides of said plate members including a plurality of C-frames longitudinally pivoted to the outsides of said trough sections for movement about axes extending longitudinally of said cradles and adapted to extend along opposite sides of said plate members, and a member mounted eccentrically of its center in the end of each of said C-frames opposite from its axis of connection to said trough and adapted to have clamping engagement with an associated plate member.

7. In a shaker conveyer trough line, a plurality of cradles, each including a pair of longitudinally extending trough supporting members and means for connecting said trough supporting members in laterally spaced relation with respect to each other, means for connecting said cradles together in end to end relationship so said trough supporting members will abut and form spaced apart columns extending the entire length of the conveyer to take the stresses of the conveyer during reciprocation thereof, a trough section adapted to be mounted in each of said cradles and form a material conveying means for the conveyer, and means for detachably mounting said trough sections on said cradles including a plurality of plate members projecting laterally outwardly from each of said trough supporting means, and clamping members attached to the outsides of said trough sections and adapted to have clamping engagement with opposite sides of said plate members, each of said clamping members including a bracket projecting laterally from the outside of an outer side wall of an associated trough section, and having a flat under surface adapted to engage the upper surface of an associated plate member, a C-frame pivoted to said bracket for movement about an axis extending longitudinally of the trough line and adapted to extend along opposite sides of said plate members, a circular disk pivotally mounted eccentrically of its center in the end of each C-frame opposite from its axis of connection to said trough, and a lever arm connected with said disk for pivoting said disk into engagement with the underside of an associated plate member to hold the flat underside of said bracket in engagement with said plate member.

CHARLES A. PRATT.

REFERENCES CITED

The following references are of record in the file of this patent:

UNITED STATES PATENTS

| Number | Name | Date |
|---|---|---|
| 1,899,893 | Evans, Jr. | Feb. 28, 1933 |

FOREIGN PATENTS

| Number | Country | Date |
|---|---|---|
| 418,634 | Great Britain | Oct. 29, 1934 |
| 609,531 | Germany | Jan. 31, 1935 |